United States Patent [19]

Chan

[11] Patent Number: 4,868,469

[45] Date of Patent: Sep. 19, 1989

[54] MULTI-WAY POLLING, BRANCHING AND WAITING OPCODE

[75] Inventor: David A. Chan, San Jose, Calif.

[73] Assignee: Advanced Micro Devices, Inc., Sunnyvale, Calif.

[21] Appl. No.: 194,608

[22] Filed: May 16, 1988

[51] Int. Cl.⁴ .............................................. G05B 19/18
[52] U.S. Cl. .................................... 318/254; 318/138; 318/599
[58] Field of Search ................ 318/138, 254, 439, 599

[56] References Cited

U.S. PATENT DOCUMENTS

| 4,169,991 | 10/1979 | Ross ..................................... 318/599 |
| 4,383,245 | 5/1983 | Cooley et al. .................. 318/599 X |
| 4,506,202 | 3/1985 | Tajima et al. ................... 318/599 X |
| 4,588,936 | 5/1986 | Itoh et al. ....................... 318/599 X |

Primary Examiner—Bentsu Ro
Attorney, Agent, or Firm—Skjerven, Morrill, MacPherson, Franklin & Friel

[57] ABSTRACT

Disclosed are an opcode and associated circuitry which enable various polling, branching and waiting logic to occur within one machine cycle. This circuitry can be applied in a variety of different applications where multi-way branching is required promptly when particular input patterns or desired state signals are detected.

3 Claims, 6 Drawing Sheets

| JMP1 (5-0) | Description - External condition jump group 1 |
|---|---|
| D5 D4 D3 D2 D1 D0 | |
| 0 0 0 0 X X | No condition selected, no jump |
| 0 0 0 1 X X | Unconditional Jump |
| 0 0 1 X X A | Jump if I-0 = A |
| 0 1 0 X B X | Jump if I-1 = B |
| 0 1 1 C X X | Jump if I-2 = C |
| 1 0 0 X B A | Jump if I-0 = A and I-1 = B |
| 1 0 1 C B X | Jump if I-1 = B and I-2 = C |
| 1 1 0 C X A | Jump if I-0 = A and I-2 = C |
| 1 1 1 C B A | Jump if I-0 = A or I1 = B or I2 = C |

[where "X" is a "don't care" and I-0, I-1 and I-2 are inputs]

| WT (3-0) | | | | Description - Wait condition codes |
|---|---|---|---|---|
| D21 | D20 | D19 | D18 | |
| 0 | 0 | 0 | 0 | No waiting is needed, proceed directly to next sequential instruction, unless a jump situation occurs. |
| 0 | 0 | 0 | 1 | Wait until a Hall State transition is detected, then proceed to next sequential instruction, unless a jump situation occurs. |
| 0 | 0 | 1 | A | Wait until I-3 = A, then proceed to next sequential instruction, unless a jump situation occurs. |
| 0 | 1 | 0 | A | Wait until I-4 = A, then proceed to next sequential instruction, unless a jump situation occurs. |
| 0 | 1 | 1 | A | Wait until I-5 = A, then proceed to next sequential instruction, unless a jump situation occurs. |
| 1 | C | B | A | Wait until I-3 = A, I4 = B and I5 = C, then proceed to next sequential instruction, unless a jump situation occurs. |

[where I-3, I-4 and I-5 are inputs]

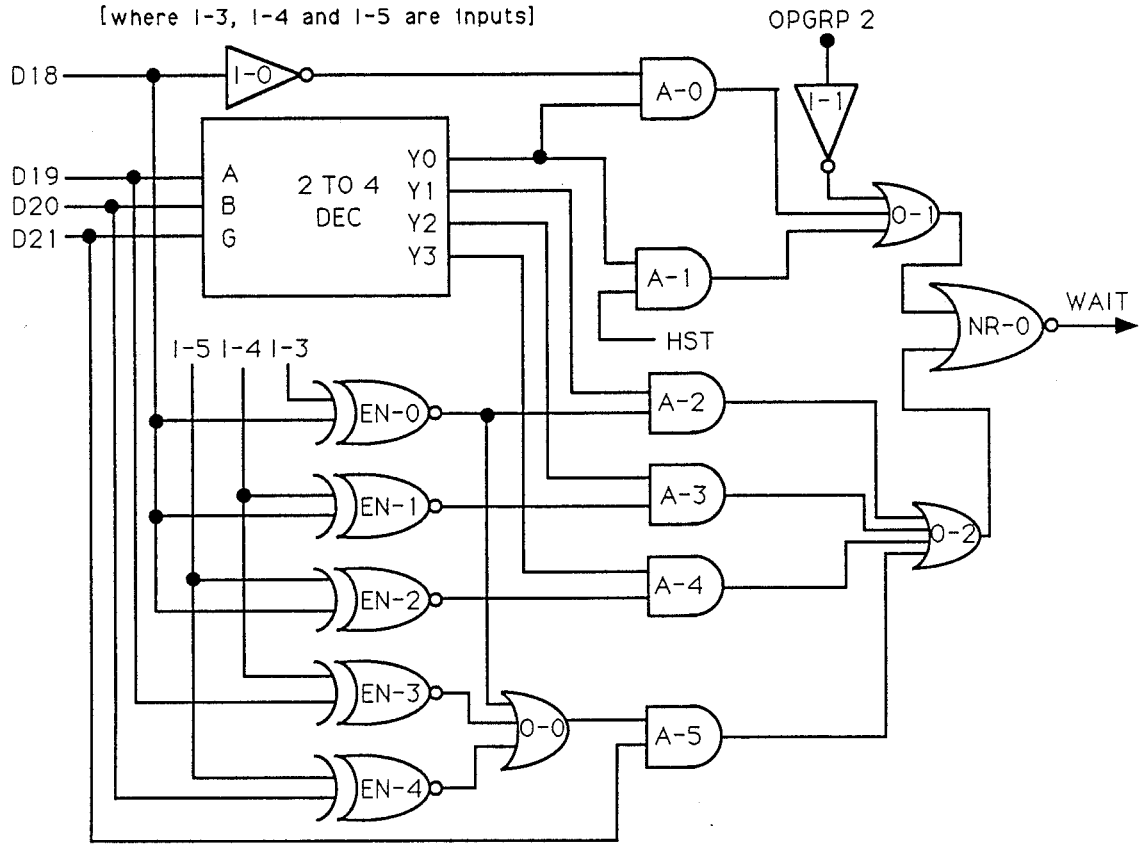

FIGURE 5

| WORD | OPCODE | DESCRIPTION |
|---|---|---|
| | | Idling: |
| 0 | 10 0000 00 010X0X XXXXX 00000 | The state machine stays at Word 0 until a START signal is received, at which point it proceeds to Word 1 |
| | | Program clock generator |
| 1 | 01 0000XX XXXXX 0 0 XXX 1 1 0001 | Program in the clock generator value |
| | | Start motor at maximum speed |
| 2 | 00 1 010 1 1 1000000000000000 | Program in dead time value, desired direction and maximum no movement time as FV. Start motor at maximum speed. |
| | | Wait for movement or counter overflow and start automatic adjustment of speed |
| 3 | 10 0001 10 0000XX 01110 XXXXX | Wait for next phase or counter overflow. If counter overflow, jump to Error State (Word 17). |
| 4 | 00 0 XXX 1 1 0000000001000000 | Program an Ep to drive the motor as FV. |
| 5 | 01 0000XX XXXXX 1 0 XXX 0 0 XXXX | Put to automatic speed adjustment. |
| | | Automatic adjustment of speed |
| 6 | 00 0 XXX 1 1 1111010100100110 | Program desired final velocity (FV = -2778) and direction. Clock in previous FV as the new Ep. |
| 7 | 10 0001 10 0000XX 01010 XXXXX | Wait for next phase or counter overflow. If counter overflow, jump to Error State (Word 17). |
| 8 | 00 0 XXX 1 1 1111010100100110 | Program desired final velocity (FV = -2778) and direction. |
| 9 | 11 0 0000000000000000 11110 | Jump to Word 7 if greater than desired speed. |
| 10 | 11 1 0000000000000000 11101 | Jump to Word 7 if less than desired speed. |
| | | At desired speed, switch control block over to Index input |
| 11 | 01 0000XX XXXXX 1 1 001 0 0 XXXX | At desired speed, turn on FINAL (OUT 0 = 1). |
| 12 | 10 0001 10 0000XX 00101 XXXXX | Wait for next phase or counter overflow. If counter overflow, jump to Error State (Word 17). |
| 13 | 00 0 XXX 1 1 1011111011100101 | Program desired final velocity (FV = -16667) and direction based on Index input. |
| 14 | 10 0000 10 0110XX 00011 00000 | Wait for next Index input or counter overflow. If counter overflow, jump to Error State (Word 17). |
| 15 | 01 0001XX 11110 1 0 XXX 0 0 XXXX | Jump to Word 12. |
| 16 | XXXXXXXXXXXXXXXXXXXXXXXXX | Error State |
| 17 | 00 1 111 0 X XXXXXXXXXXXXXXXX | Disable output device. |
| 18 | 01 0001XX 00000 0 1 010 0 0 XXXX | Signal ERROR (OUT1 = 1) and stop. |

FIGURE 6

MULTI-WAY POLLING, BRANCHING AND WAITING OPCODE

FIELD OF THE INVENTION

This invention relates to a digital logic circuit which, in response to user programmable opcodes, performs various polling, branching and waiting functions in a single machine cycle.

BACKGROUND OF THE INVENTION

There are a variety of computer applications which require the functions of polling inputs for particular values, waiting until such values are detected, and then branching to perform other functions depending upon the particular value or values detected. Although this functionality can be implemented solely in software, certain applications necessitate the speed provided by dedicated circuitry.

The typical tradeoff for this speed is a lack of fexibility. Hardwired circuitry cannot easily be altered when a particular customer's needs require certain additional or modified functionality. Certain applications, however, would benefit significantly from both speed and a certain degree of programmable flexibility. One such application is a digital, brushless DC motor controller.

Complex control circuitry is often required to detect and decode the rotor position of a DC motor, and to control accurately the speed of that motor. A common method of detecting the motor's rotor position involves the use of "Hall effect sensors." These sensors signal the controller with information distinguishing among the discrete sectors into which the rotor's position is conceptually divided. By sampling the Hall sensor information periodically, a controller can determine the actual speed of the motor, and can then vary that speed accordingly (by adjusting inputs to the motor itself to increase or decrease that speed).

Prior art DC motor controllers (such as the IP3M05 from Integrated Power Semiconductors, Ltd., and the MC33034 from Motorola, Inc.) utilize hardwired circuitry to analyze the Hall sensor information and vary the speed of the motor accordingly. These analog, non-programmable devices utilize linear integrated circuits to perform these functions.

Although these prior art devices are to a limited extent metal mask configurable, none of these devices offers the user the ability to program, for example, customized motor velocity and acceleration profiles, variable Hall state sensor spacing, and customized error or other state detection signals. The flexibility offered by such a user-programmable DC motor controller significantly increases the need for fast polling, branching and waiting logic to enable the user to control the precise speed of the motor under a variety of circumstances, with sufficiently rapid response time.

SUMMARY OF THE INVENTION

In accordance with this invention, an opcode and associated circuitry are provided which enable various polling, branching and waiting logic to occur within one machine cycle. This invention can be applied in a variety of different applications where multi-way branching is required promptly when particular input patterns or desired state signals are detected.

The preferred embodiment of this invention comprises a user-programmable brushless DC motor controller—the Programmable DC Motor Control Unit ("PMC"). In order to provide users with the flexibility of controlling the motor's speed under a variety of conditions, the PMC performs a variety of programmable functions, including waiting for a Hall state transition and branching to another function if a particular Hall state sensor value or an error condition is detected.

These functions are performed by the PMC in response to a program consisting of a set of commands, commonly known as "instructions". These functions are organized into four discrete instruction formats, known as "opcodes." The user programs the PMC by writing a sequence of instructions, each of which constitutes an instance of one of the four opcodes. The precise functions specified in these opcodes are described below in greater detail.

Briefly, two of these opcodes specify various initialization tasks for the PMC to perform, such as setting the desired velocity and direction of the motor. A third opcode specifies information for controlling the speed of the motor, such as enabling and decrementing timers to control the PMC's internal clock frequency. Finally, a fourth opcode enables the user to check whether the speed of the motor is within the desired tolerance for velocity errors.

This invention, however, is focused on the portions of these opcodes ("fields") which specify the various programmable polling, waiting and branching functions that provide the user with the flexibility of controlling many of the motor's operating features. These basic functions enable the user to detect various conditions (such as the overflow of counters, interrupts from external devices and Hall state transitions), and then invoke additional functions which control the motor's operation, depending upon the detection of these and other conditions.

The user can, for example, wait for a certain Hall state transition (or a set of Hall state transition), and then perform a particular action, such as increasing the motor's velocity. By creating a program comprising a sequence of instructions, each of which initiates one or more of these actions, the user can in effect customize a variety of the PMC's functions, including complex velocity and acceleration profiles, as well as a variety of error detection and correction procedures.

This flexibility, however, necessitates an extremely quick mechanism to enable the PMC (under the user's programmed control) to detect a variety of conditions (such as Hall state transitions) and to respond appropriately (e.g., by branching to additional instructions which vary the speed of the motor). Rapid response time by the PMC is critical.

A traditional software loop would require multiple machine cycles to execute, and would therefore be too slow to solve this problem. The preferred embodiment of this invention includes circuitry which enables the PMC to perform certain flexible polling, branching and waiting functions in one machine cycle.

For example, one instruction might cause execution to branch to a specified address (of another instruction) if a particular Hall state transition is detected. Another instruction of the same opcode type might cause execution to branch to a different address if any one of three particular Hall state transitions is detected. Regardless of which of these instructions is executed, only one machine cycle is required to match the Hall state transition pattern with the desired patterns, and to perform the actual branch to the desired address (where, for example, the first instruction of a velocity correction or an error handling routine might be located).

The functions which these instructions cause the PMC circuitry to perform, as well as the circuitry itself, are described in detail below.

BRIEF DESCRIPTION OF THE DRAWINGS

FIG. 5 illustrates the opcode field and associated circuitry which control the PMC's performance of certain waiting operations in a single machine cycle.

FIG. 6 illustrates a typical PMC application example in the form of a commented user program.

DETAILED DESCRIPTION OF THE PREFERRED EMBODIMENT

PMC Architecture

The following description is meant to be illustrative only and not limiting. While the preferred embodiment of this invention is described, other embodiments (which implement similar polling, branching and waiting functionality in other devices in addition to DC motor controllers) will be obvious in view of the following description.

Figure 1:
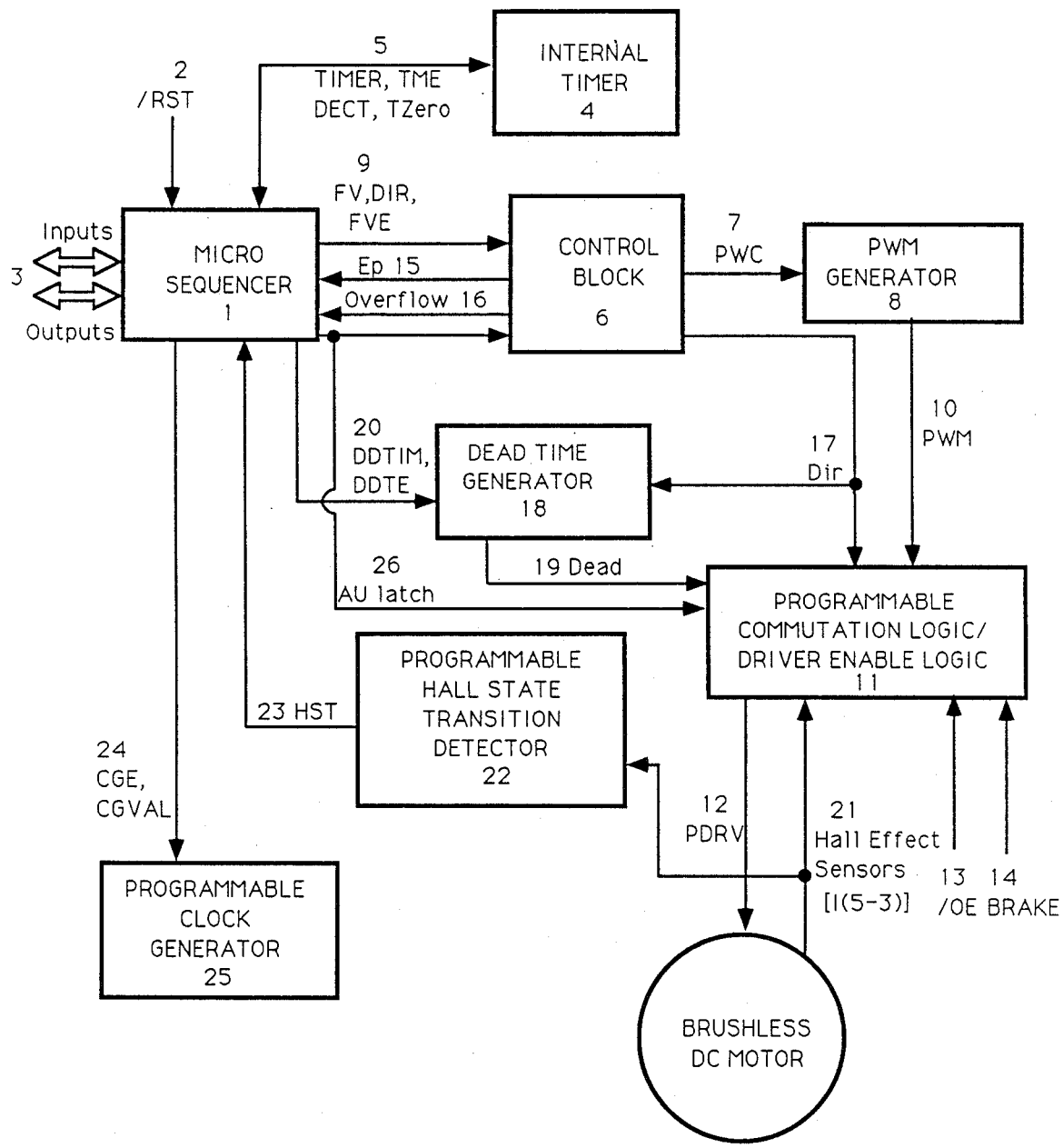
FIG. 1 illustrates a functional block diagram of the preferred embodiment of this invention, the PMC Programmable DC Motor Control Unit.

The PMC block diagram in FIG. 1 illustrates how the user retains the ability to customize the motor's entire velocity and acceleration profile, in addition to the ability to define which external interrupts and error conditions will be detected, and to fashion appropriate responses.

This is accomplished primarily by the Micro Sequencer 1, which sequences and initiates execution of each user instruction. The significant polling, branching and waiting capabilities initiated by these instructions will be described in detail below in connection with the dedicated circuitry which actually executes such instructions.

The Micro Sequencer can of course be reset to its initial state via the /RST pin 2 which, when low, causes execution to be transferred to the first user instruction. The user can program (in the preferred embodiment) three general-purpose output, and six general-purpose input, terminals 3 to facilitate communication with external devices. For example, the user might indicate to external devices (through these output terminals) such conditions as "stuck rotor fault" or "at-speed lock achieved." The input terminals might be used for condition code inputs for conditional branching based, for example, on patterns of Hall Effect position sensor inputs, found on most brushless DC motors.

Figure 3:
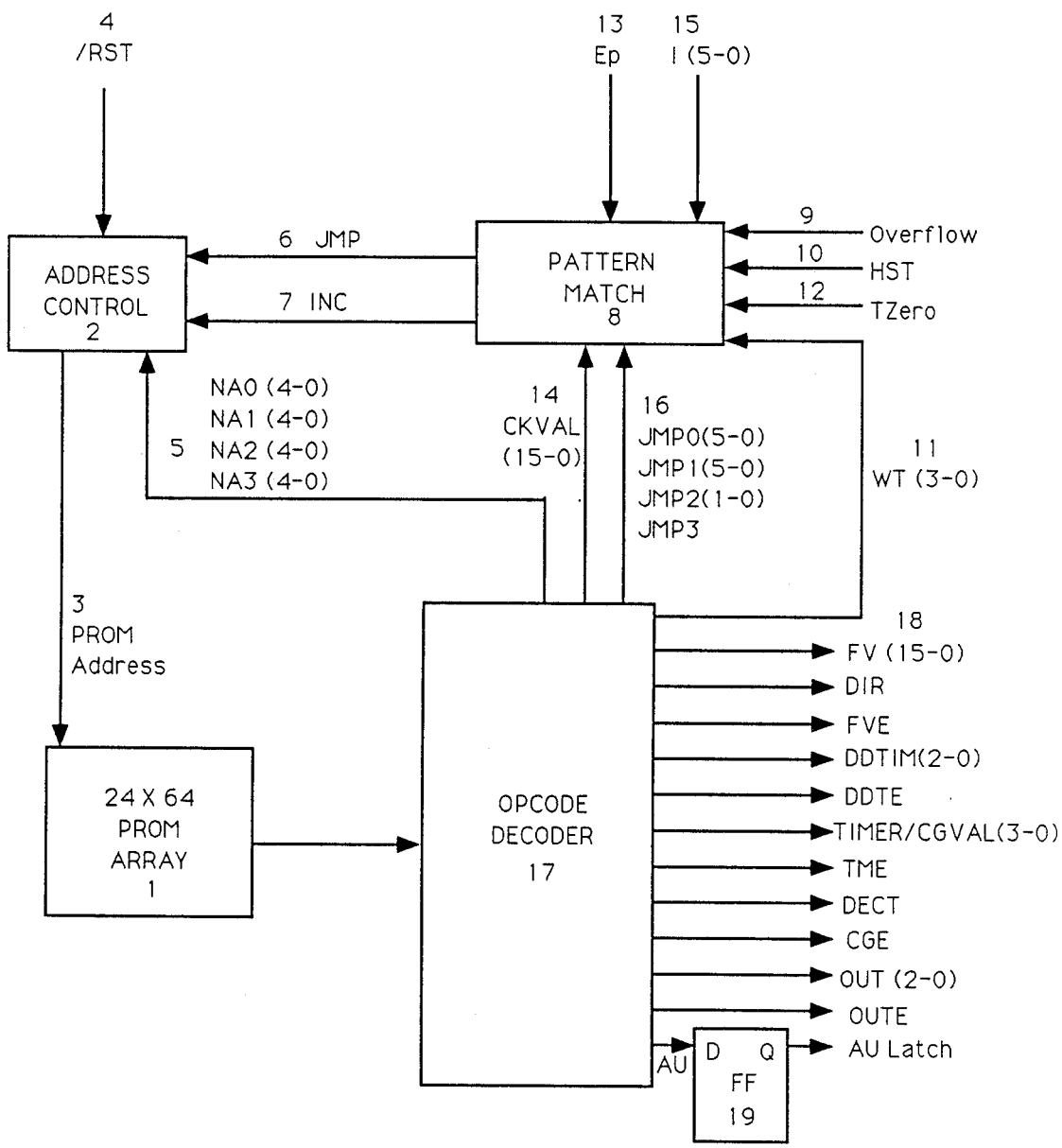
FIG. 3 illustrates the PMC micro-sequencer block diagram.

In addition to the Micro Sequencer, which generates (as illustrated in FIG. 3 and described in greater detail below) the underlying logical signals necessary to control the DC motor's velocity and acceleration profiles, the PMC includes additional logic which actually controls the motor's velocity in response to these logical signals. This additional logic forms a closed loop velocity control system with a typical brushless DC motor, and is well known in the field of brushless DC motor controllers. Nevertheless, the operation of this logic, in conjunction with the preferred embodiment of this invention (contained within the Micro Sequencer), is described below in order to illustrate the user's control over the detection and modification of the motor's velocity and acceleration profiles.

The PMC includes an Internal Timer 4 which assists the user in counting the number of occurrences of particular events. This timer can be programmed by certain fields of the user's instructions, which activate certain control leads 5, one of which ("TME") enables the latching of a designated value ("TIMER") into the Internal Timer, and another of which ("DECT") causes the current value of the Internal Timer to be decremented by one. When the Internal Timer counts down to zero, it so indicates by transmitting the "TZero" signal for detection by the user's program.

At various times while the motor is accelerating and decelerating, the user's program will detect the need to modify the motor's velocity, and will then invoke the Control Block 6 either to slow down or speed up the motor. The Control Block utilizes a well-known "proportional/integral" algorithm to calculate a "pulse width count" (PWC) 7, which is used by the PWM Generator 8 to generate pulses that control the motor's velocity. This algorithm is implemented as described below.

Once the user detects a Hall state transition (as explained below), the user may, if desired, initiate communication with the Control Block 6 via a group of three user-specified fields 9. By setting the first of these fields (the final velocity enable signal or "FVE") high, the user's program will cause the values represented by the other two fields (the user's desired final motor velocity, "FV," and motor direction, "DIR") to be latched into a register in the Control Block. In the preferred embodiment, FV is a 16-bit 2's complement negative number the absolute value of which represents the number of Control Block clock cycles in the interval between adjacent transitions of states of the Hall Effect sensor outputs of the brushless DC motor when that motor is spinning at the specified final velocity.

When FVE goes high, FV is loaded into the Control Block's 16-bit "up-counter," and the previous value of that counter is clocked into a Control Block register as a "proportional error" value, representing the degree to which the motor has either exceeded or not yet reached the user-specified final velocity (because, at final velocity, the counter should count up to zero). The Control Block also maintains a sum of previous proportional error values, known as the "integral error." Each time the Control Block's upcounter is reloaded, the current proportional error and integral error values are summed, and then scaled to yield the "pulse width control" value (PWC) 7 used to adjust the motor's velocity.

Some manner of scaling is necessary because, although various PWC values will be accurate relative to one another, they may not fall within the appropriate range of absolute values necessary to modify the motor's velocity by the desired amount. In essence, PWC represents the ratio of high to low pulses necessary to generate the desired motor velocity. If, for example, PWC is an eight-bit number (ranging from 0 to 255), then a value of 0 indicates that no high pulses will be generated, while a value of 255 will cause all pulses to be high, and a value in between 0 and 225 will result in the generation of the corresponding ratio of high to low pulses.

Note, however that the amplitude and frequency of these pulses remains constant, with only the ratio of high to low pulses (i.e., the pulse width, or duty cycle) changing, thereby causing a change in the motor's velocity.

The PWM Generator utilizes the PWC to generate the proper timing for emitting pulses, or "pulse width modulated" outputs (PWM) 10, to control the motor's velocity (in accordance with the ratio of high to low pulses represented by PWC). The PWM signal 10 is then utilized by the Programmable Commutation Logis/Drive Enable Logic 11 to enable the motor's phase drivers (PDRV) 12 at the proper rate of pulse width modulation corresponding to the actual spacing of the Hall state sensors.

Constant values for the commutation table are generated by the manufacturer for each particular set of Hall state sensors. In this manner, the same PWM value 10 generated by the PWM Generator 8 can be used to effect changes in the motor's velocity even if different sensor spacing is employed (because the change in sensor spacing is accounted for by the Programmable Commutation Logic/Drive Enable Logic 11).

Thus, the PWM signal 10 determines the actual speed of the motor, because the phase drivers 12 are in essence "low pass filtered" by the motor, i.e., they are turned on and off very quickly (relative to the detection of velocity changes) such that the average current the motor receives controls its speed (just as a light which is turned on and off very quickly appears to be on constantly at a brightness proportional to the average brightness, or ratio of "on to off" switches, during a particular period of time).

The phase drivers 12 can be disabled directly by a high output enable signal (OE) 13, external to the PMC. Moreover, an external "BRAKE" signal 14 causes the Programmable Commutation Logic/Drive Enable Logic 11 to brake the motor dynamically (utilizing pre-programmed values for the phase drivers).

While the Control Block is effecting user-specified modifications to the motor's velocity, it also passes certain information back to the Micro Sequencer for detection by the user's program (such as the proportional error value (Ep) 15 calculated by the Control Block, and an overflow signal 16 which indicates whether the timer counted up through zero and beyond its maximum positive value, 32,767, in between Hall state transitions).

In addition, the Control Block transmits the motor's direction (DIR) 17 both to the Programmable Commutation Logic/Drive Enable Logic 11 (because the motor's direction affects the calculation of the proper timing of the phase drivers 12 for different Hall state sensor spacings), and to the Dead Time Generator 18 (which disables the phase drivers, after a change in the motor's direction, for the specified "dead time" interval 19, insuring that switch overlap, and a short of the high voltage power supply, does not occur). The length of the dead time is programmable through certain fields of the user's instructions, which cause dead time enable ("DDTE") and value ("DDTIM") signals 20 to be sent to the Dead Time Generator 18.

In order to effect changes in the motor's velocity (via the Control Block 6, PWM Generator 8, Programmable Commutation Logic/Drive Enable Logic 11 and Dead Time Generator 18 modules described above), the user's program must first detect Hall state transitions. Only then can the program instruct the Control Block to check its counter and determine if any adjustment in the motor's velocity is necessary. Well-know Hall state sensors 21 and a Programmable Hall State Transition Detector 22 (which simply "reads" the sensors and determines whether the motor has advanced to the next Hall state ) are utilized to provide the user's program (executing within the Micro sequencer 1) with this "Hall state transition" (HST) 23 information.

Once the motor is within the desired speed range (as indicated by a proportional error (Ep) value 15 of zero), the Control Block can be reconfigured by the user's program. In other words, the user need not cause FV to be latched into the Control Block after each Hall state transition. Instead, the user may decide to latch this value only after a certain period of time has passed, or after one particular Hall state (or any combination of Hall states ) has been detected.

This mechanism enables the user to maintain extremely precise control over the motor's velocity and acceleration profiles. Moreover, the gain of the control loop is adjustable by varying the Control Block clock frequency (by sending clock generator enable ("CGE") and frequency value ("CKVAL") signals 24 to the Programmable Clock Generator 25), because that frequency directly affects the proportional and integral error values.

The user can also completely disable this motor velocity control mechanism via the "AU" field. If this field contains a value of zero, the Micro Sequencer will send a low "AUlatch" signal 26 to disable the use of the Control Block entirely, leaving the phase drivers 12 on constantly until the AUlatch signal 26 goes high. This forces the motor to spin at "full open loop speed."

Once the user directs the AUlatch signal 26 to re-enable the user of the Control Block, the phase drivers will again be pulse width modulated, thereby only being turned on during the pulses generated by the PWM Generator 8. The BRAKE signal 14 overrides the effects of the Control Block on the phase drivers, and forces a dynamic braking function to occur, which causes the motor to come to a quick stop instead of a long coast down to a stop.

PMC Opcode Formats

Before describing the internal details of the Micro Sequencer, including the circuitry which implements the preferred embodiment of this invention, it is helpful to understand the actual formats (opcodes) of the user's instructions which direct that circuitry to perform the various polling, branching and waiting functions underlying this invention.

Figure 2:
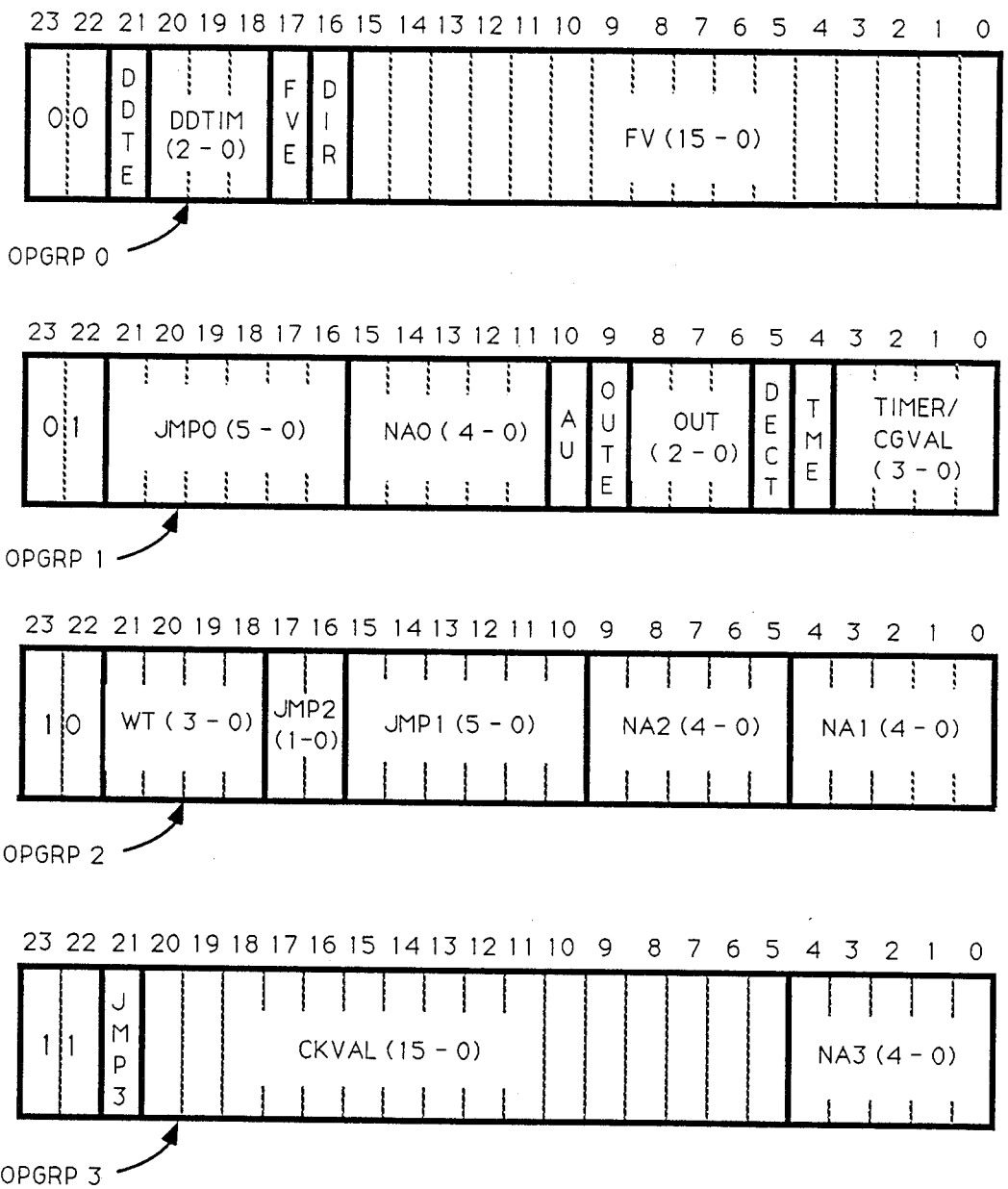
FIG. 2 illustrates the formats for the four user-programmable PMC opcodes.

FIG. 2 illustrates the four opcode format types, delineated by the most significant two bits (bits 22 and 23) of each opcode, thus accounting for the four opcode group or "OPGRP" names. The PMC contains a PROM Array (illustrated in FIG. 3) which, in the preferred embodiment, is 64 words deep, each word of memory consisting of a 24-bit user instruction, each instruction conforming to one of the four opcode types.

As mentioned above, this invention will be described primarily with respect to OPGRP 2. Nevertheless, it is important to understand the meaning of each functional field of each opcode in order to appreciate the degree of control provided the user. Each field is described below, followed by a detailed description of the OPGRP 2 fields and associated circuitry.

The OPGRP 0 opcode is used primarily for initialization of the PMC. The two most significant bits (bits 22 and 23) designate the instruction as an OPGRP 0 opcode. The next two most significant fields, "DDTE" (bit 21) and "DDTIM(2-0)" (bits 20-18), enable the user to specify the "dead time," during which the phase drivers are disabled, to prevent a possible short of the high-voltage power supply to ground via the power drivers after a change in direction of the motor. The actual dead time is indicated by the three-bit value in DDTIM(2-0). If that value="111," then the phase drivers are disabled indefinitely. The DDTE signal causes the DDTIM(2-0) value to become effective, by being latched into the Dead Time Generator.

The last three fields of OPGRP 0, "FVE" (bit 17), "DIR" (bit 16) and "FV(15-0)" (bits 15-0), enable the user to specify the desired final velocity and direction of the motor. FV(15-0) contains the actual final velocity of the motor, which represents the number of Control Block clock cycles in the interval between Hall Effect sensor state transitions. DIR represents the direction (clockwise or counterclockwise) in which the user desires the motor to spin. When the user sets FVE="1," the Micro Sequencer causes the final velocity value, specified in FV(15-0), to be latched into the Control Block, where it is used to calculate the pulse width modulation count which ultimately controls the velocity of the motor. As explained above, the user will generally cause the final velocity value to be latched upon Hall Effect sensor state transitions.

Thus, OPGRP 0 enables the user to initialize PMC values, such as the final velocity and direction of the motor and the amount of dead time between changes in motor direction.

OPGRP 1 also enables the user to perform certain initialization tasks. The two most significant bits (bits 22 and 23) designate the instruction as an OPGRP 1 opcode.

The next two most significant fields, "JMPO(5-0)" (bits 21-16) and "NAO(4-0)" (bits 15-11), enable the user conditionally to transfer execution to another instruction of the user's program (by a specified offset), based upon certain combinations of external conditions. Because this conditional branching field and associated circuitry is intimately intertwined with this invention, it will be discussed below in greater detail (in connection with the "JMP1(5-0)" field of OPGRP 2).

The next most significant field, "AU" (bit 10), enables the user (by setting AU="0") to disable the pulse width modulated driver control logic, thereby causing the motor to run at full speed (because the phase drivers will always be turned on). Once an OPGRP 1 instruction is executed with AU ="1," the phase drivers are once again controlled by the Control Block pulse width modulated driver control logic.

The next two most significant fields, "OUTE" (bit 9) and "OUT(2-0)" (bits 8-6), enable the user (by setting OUTE ="1") to latch the three general-purpose outputs (specified in OUT(2-0)) as output signals on the pins of the PMC.

The last three fields, "DECT" (bit 5), "TME" (bit 4) and "TIMER/CGVAL" (bits 3-0), enable the user to program the values of the 4-bit Internal Timer or the 4-bit Programmable Clock Generator. TIMER/CGVAL represents the actual 4-bit value to be latched into the Internal Timer and/or the Programmable Clock Generator. When TME="1" and DECT="0," the TIMER/CGVAL value is latched into the Internal Timer. If both TME="1" and DECT="1," then that value is latched into the Programmable Clock Generator. In addition, whenever DECT="1" and TME="0," the Internal Timer value is decremented by one.

Thus, with the exception of the JMPO(5-0) branch condition (which will be discussed in greater detail below), OPGRP 1 primarily enables the user to control the speed of the motor by setting the Programmable Clock Generator value, in addition to setting the Internal Timer which can be used for a variety of user-customized timing functions, such as determining the speed of the motor after the occurrence of a particular condition is detected.

OPGRP 3 enables the user to check and control the velocity of the motor. The two most significant bits (bits 22 and 23) designate the instruction as an OPGRP 3 opcode. The remaining three fields, "JMP3" (bit 21), "CKVAL(15-0)" (bits 20-5), and "NA3(4-0)" (bits 4-0), enable the user to check for and handle proportional velocity errors.

As described above, FV(15-0) contains the user-specified final velocity value, which is latched into a counter that should reach zero by the next Hall Effect sensor state transition, if the motor actually spins at that velocity. The counter's value after each transition (represented by Ep in FIG. 2) is transferred to the Micro Sequencer. A nonzero value represents the "proportional error" used by the Control Block to calculate the necessary values to enable the phase drivers to correct the motor's velocity.

This proportional error value is also used by the user to invoke the appropriate response to velocity errors. The NA3(4-0) field represents a five-bit offset address (within the 64-word user program) from the address of the current instruction, to which execution will conditionally be transferred. The CKVAL(15-0) field represents a 16-bit number which is compared against the proportional error value. The JMP3 field represents the condition upon which execution will be transferred by the specified NA3(4-0) offset. If JMP3="0," execution will be transferred if the proportional error value equals or exceeds the user-specified CKVAL(15-0). If JMP3="1," execution will be transferred if the proportional error value is less than the user-specified CKVAL(15-0).

Thus, the OPGRP 3 opcode (as opposed to the OPGRP 0 and OPGRP 1 opcodes, which are used primarily to initialize PMC variables) enables the user to define the appropriate response to velocity errors, thereby providing the user with frequent control over the PMC motor's velocity.

The OPGRP 2 opcode enables the user to test combinations of the six general purpose PMC inputs, and then branch accordingly to other user instructions, perhaps after waiting for the occurrence of one or more particular events. It is this opcode, and its associated circuitry, which makes possible the rapid response time necessary to control the speed of the motor. As will be demonstrated below, the unique functions performed by this circuitry, and available to be programmed by the user through this opcode, enable the user to customize motor velocity and acceleration profiles, to detect and respond to external interrupts, as well as to user-defined conditions (such as velocity errors beyond a particular threshold), and to provide desired output signals to external devices, such as "stuck rotor fault" or "at-speed lock achieved."

The two most significant bits (bits 22 and 23) designate the instruction as an OPGRP 2 opcode. The next most significant field, "WT(3-0)" (bits 21-18), performs one of a variety of complex waiting functions, based upon the four-bit value specified in this field.

If "0000" is specified, no waiting is necessary, and execution proceeds to the next sequential instruction. If "0001" is specified, the Micro Sequencer waits until a Hall state transition is detected by the Programmable Hall State Transition Detector (see FIG. 2), at which point execution proceeds to the next sequential instruction, unless a jump condition (specified in other fields of this opcode) is satisfied.

If "001A" is specified, the Micro Sequencer waits until input 3 equals A(I3=A), and then proceeds to the next sequential instruction, unless a jump condition (specified in other fields of this opcode) is satisfied. If "010A" is specified, the Micro Sequencer waits until I4=A, and then proceeds to the next sequential instruction, unless a jump condition is satisfied. If "011A" is specified, the Micro Sequencer waits until I5=A, and then proceeds to the next sequential instruction, unless a jump condition is satisfied. Finally, if "1CBA" is specified, the Micro Sequencer waits until I3=A, I4=B and I5=C, and then proceeds to the next sequential instruction, unless a jump condition is satisfied.

The remaining fields, consist of two "jump condition" fields," "JMP2(1-0)" (bits 17-16) and "JMP1(5-0)" (bits 15-10), and "address offsets," "NA2(4-0)" (bits 9-5), corresponding to JMP2(1-0), and "NA1(4-0)" (bits 4-0), corresponding to JMP1(5-0). These jump conditions (discussed below), if satisfied, cause execution to be transferred by the specified offset. Also discussed is the JMP0(5-0) jump condition and associated NA0(4-0) address offset specified in bits 21-16 and 15-11, respectively, of OPGRP 1.

The JMP2(1-0) field, if equal to "00," will cause the Micro Sequencer unconditionally to continue to the next sequential instruction (i.e., no jump condition is specified) after the pattern being waited for (if any) is detected, unless the JMP1(5-0) jump condition (described below) is satisfied. If "01" is specified, the Micro Sequencer will unconditionally jump by the offset specified in NA2(4-0), unless overridden by a JMP1(5-0) jump condition also being satisfied. If "10" is specified, the Micro Sequencer will jump by the offset specified in NA2(4-0) if an overflow condition on the clock counter is detected, unless overridden by a JMP1(5-0) jump condition also being satisfied. Finally, if "11" is specified, the Micro Sequencer will jump by the offset specified in NA2(4-0) if the value of the internal timer is zero, unless overridden by a JMP1(5-0) jump condition also being satisfied.

The JMP0(5-0) field (of the OPGRP 1 opcode), if equal to "0000XX," will cause the Micro Sequencer unconditionally to continue to the next sequential instruction (once any waiting is completed). If "0001XX" is specified, the Micro Sequencer will unconditionally jump by the offset specified in NA0(4-0).

If "001XXA" is specified, the Micro Sequencer will jump by the offset specified in NA0(4-0) if input 3 equals A (i.e., if I3=A). If "010XBX" is specified, the Micro Sequencer will jump by the offset specified in NA0(4-0) if I4=B. If "011CXX" is specified, the Micro Sequencer will jump by the offset specified in NA0(4-0) if I5=C. If "100XBA" is specified, the Micro Sequencer will jump by the offset specified in NA0(4-0) if I3=A and I4=B. If "101CBX" is specified, the Micro Sequencer will jump by the offset specified in NA0(4-0) if I4=B and I5=C. If "110CXA" is specified, the Micro Sequencer will jump by the offset specified in NA0(4-0) if I3=A and I5=C. If "111CBA" is specified, the Micro Sequencer will jump by the offset specified in NA0(4-0) if I3=A or I4=B or I5=C.

Similarly, the JMP1(5-0) field (of the OPGRP 2 opcode), if equal to "0000XX," will cause the Micro Sequencer unconditionally to continue to the next sequential instruction. If "0001XX" is specified, the Micro Sequencer will unconditionally jump by the offset specified in NA1(4-0).

If "001XXA" is specified, the Micro Sequencer will jump by the offset specified in NA1(4-0) if input 0 equals A (i.e., if I0=A). If "010XBX" is specified, the Micro Sequencer will jump by the offset specified in NA1(4-0) if I1=B. If "011CXX" is specified, the Micro Sequencer will jump by the offset specified in NA1(4-0) if I2=C. If "100XBA" is specified, the Micro Sequencer will jump by the offset specified in NA1(4-0) if I0=A and I1=B). If "101CBX" is specified, the Micro Sequencer will jump by the offset specified in NA1(4-0) if I1=B and I2=C. If "110CXA" is specified, the Micro Sequencer will jump by the offset specified in NA1(4-0) if I0=A and I2=C. If "111CBA" is specified, the Micro Sequencer will jump by the offset specified in NA1(4-0) if I0=A or I1=B or I2=C.

Thus, the jump condition and address offset fields, found primarily in OPGRP 2, enable the user to poll various combinations of the six general purpose inputs (I0-I5), and then branch by a specified offset (i.e., to a particular instruction or routine of the user's program), perhaps after waiting for one or more particular conditions to be satisfied. The circuitry which implements this unique functionality in one machine cycle will now be described, after an explanation of the internal Micro Sequencer components.

The Micro Sequencer

By examining the four basic components of the Micro Sequencer, illustrated in FIG. 3, the circuitry which implements the rapid polling, branching and waiting functionality can be understood in context.

The PROM Array 1 is the storage area which contains the maximum 64-word user program (in the preferred embodiment), each word (or instruction) of which is 24 bits long. The Address Control mechanism 2 controls the execution sequence of the instructions of the user's program, by selecting an instruction by its PROM Address 3 for execution. The /RST signal 4 will cause the Address Control mechanism to issue the first sequential PROM Address (i.e., address "000000"), after initializing various PMC components.

Examining the fields of each of the four opcodes illustrated in FIG. 2, it is apparent that the possible address offsets 5 are NA0(4-0), NA1(4-0), NA2(4-0) and NA3(4-0), each of which is a 5-bit address offset. If a jump condition is satisfied (indicated by the "JMP" signal 6), the corresponding 5-bit address offset is sign-extended to a 6-bit offset, and added to the current address to form the next address. Otherwise, the Micro Sequencer will either stay at the current address and again execute the current instruction (until a "wait" condition is satisfied), or execute the next instruction at the next sequential address (indicated by the "INC" signal 7).

Instructions containing the OPGRP 1 (JMP0) and OPGRP 3 (JMP3) fields will always progress to the next sequential instruction if the jump condition is not satisfied; whereas instructions containing the OPGRP 2 (JMP1 and JMP2) fields will only progress to the next sequential instruction (if no jump condition is satisfied) after the event being waited for (if any) has occurred. The addressing will "wrap around" such that the first instruction in the PROM Array is the next sequential instruction following the last instruction.

Because each instruction executes in one machine cycle, the addressing mechanism is synchronized with the rising edge of the system clock, which is also referenced by the Control Block to measure the speed of the motor. The frequency of the system clock can be programmed by the user through the Programmable Clock Generator (see FIG. 1).

The Pattern Match mechanism 8 contains the actual circuitry (of the preferred embodiment of this invention) which determines whether the conditional jump and wait conditions are satisfied, and then issues the appropriate JMP and INC signals to the Address Control mechanism. The actual pattern matching circuitry is described in greater detail below.

In order to perform its pattern matching functions, the Pattern Match mechanism receives as input the Overflow condition 9 (generated when the Control Block detects an internal counter overflow, to be compared in the JMP2(1-0) field of an OPGRP 2 instruction), the HST signal 10 (generated when the Programmable Hall State Transition Detector detects a Hall state transition, to be compared in the WT(3-0) field 11 of an OPGRP 2 instruction), the TZero condition 12 (generated when the Internal Timer reaches zero, to be compared in the JMP2(1-0) field of an OPGRP 2 instruction), the proportional error value (Ep) 13 (calculated in the Control Block and used to compare against the user-specified CKVAL(15-0) 14 for velocity error-checking in OPGRP 3 instructions) and the six general purpose inputs (I(5-0)) 15 (including, for example, three-bit Hall sensor outputs, to be compared against the user-specified bits within the jump conditions 16 of certain user instructions).

The opcode Decoder 17 receives the actual bits of each user instruction and, using the two most significant bits of each instruction to determine which of the four types of opcodes is being executed, decodes each such instruction into its corresponding fields, and then multiplexes the four address offset fields 5 into the Address Control mechanism the CKVAL(15-0) field 14, jump condition fields 16 and the WT(3-0) field 11 into the Pattern Match mechanism, and the remaining data and control fields 18 as outputs into other components external to the Micro Sequencer (see FIG. 1).

Note that the AU field value is first stored in a flip-flop 19, so that a continuous signal (AUlatch) can be maintained (latching into the Programmable Commutation Logic/Driver Enable Logic mechanism, causing the motor either to run at full speed or to be pulse width modulated) until the user issues another OPGRP 1 instruction with the opposite value.

Branching Opcode Field and Associated Circuitry

Figure 4:
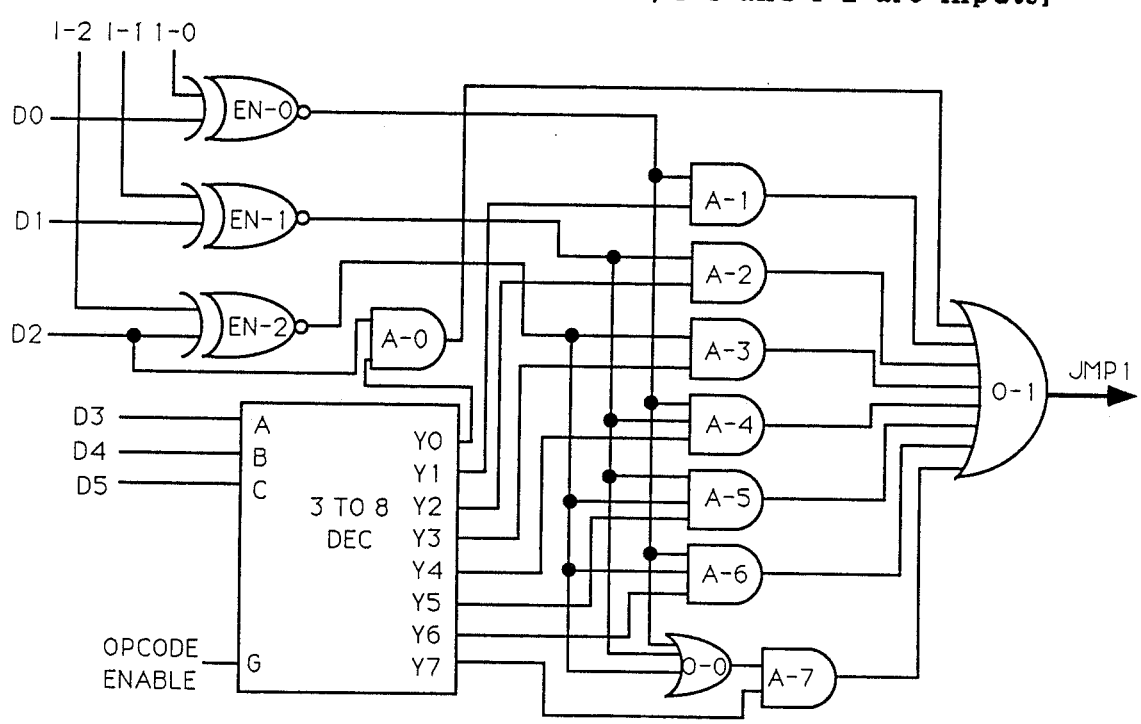
FIG. 4 illustrates the opcode field and associated circuitry which control the PMC's performance of certain branching operations in a single machine cycle.

FIG. 4 illustrates the possible values of the opcode field of OPGRP 2 (illustrated in FIG. 2) and the associated circuitry controlled by the opcode field, which performs the PMC's unique branching operations in a single machine cycle.

Normally, user program execution proceeds sequentially from one instruction to the next instruction in sequence. This opcode field permits the PMC user to instruct the PMC to branch (transfer execution) to a user instruction other than the next sequential instruction.

Yet, instead of permitting the user to branch depending upon whether one particular condition is satisfied (as is the case with prior art software branch conditions), this opcode field permits the user to test various permutations of such conditions, all in a single machine cycle. Moreover, another field (described below) permits the user to wait for the occurrence of a particular event before proceeding to the next instruction (as opposed to utilizing a prior art software loop, which would require many machine cycles, and would be too slow to be feasible for certain applications, such as the PMC, which requires rapid response time to Hall state transitions).

Looking at the opcode field permutations illustrated on the top half of FIG. 4, it can be seen that the three most significant bits (37 D5," "D4" and "D3") of this six-bit opcode field permit the user to test any of eight different conditions (e.g., permutations of three bits representing Hall state transitions being polled by the PMC), and to branch (or not branch, based also upon the value of "D2") to another instruction, conditioned upon the values of "D0," "D1" and "D2."

The user may cause an unconditional branch (or no branch) by specifying all zeros for bits "D5," "D4" and "D3." Otherwise, the user may cause the PMC to poll inputs I-2, I-1 and I-0 for one of seven different conditions. The user tests three of these seven conditions by specifying, in bit "D0," "D1" or "D2" of the instruction, the binary value of the individual input to be tested. The user tests three others by specifying the binary value of any two of the three inputs, and tests the final condition by specifying the binary value of all three inputs, a match on any one of which satisfies the condition.

The circuitry to implements this opcode field is also illustrated in FIG. 4. A "3 to 8 decoder" decodes the three most significant opcode bits (D3, D4 and D5) into eight possible states (Y0–Y8). By tying each of these states to a distinct logical AND gate (A-0–A-7), the outputs of which are fed into an eight-input logical OR gate (O-1), at most one AND gate will be "TRUE" at any given time (and even then, only if the condition associated with that state is satisfied). Each of the conditions themselves is a permutation of the three "match" conditions (tested via exclusive NOR gates, EN-0–EN-2) on the individual inputs I-0, I-1 and I-2.

Waiting Opcode Field and Associated Circuitry

In addition to branching, in one machine cycle (when various permutations of inputs or other conditions are satisfied), the PMC can also wait for a particular condition to be satisfied before permitting execution to be transferred to the next instruction. FIG. 5 illustrates the possible values of the opcode field and associated circuitry which performs the PMC's unique waiting functions.

If no waiting is desired, the four most significant bits of the OPGRP 2 opcode of which this waiting field is comprised are set to "0000." This causes logical AND gate A-0 to be "TRUE" (because D18 is inverted via inverter I-0, and Y0 is invoked from the "2 to 4 decoder" to which D19, D20 and D21 are inputs). Logical AND gate A-0 in turn causes logical OR gate O-1 to be "TRUE," which causes NOR gate NR-0, and thus the "WAIT" condition, to be "FALSE."

If waiting is desired, but only until a Hall state transition is detected (designated by "0001"), state Y0 will cause logical AND gate A-1 to be "FALSE" (but only until the Hall state transition ("HST") is detected), which in turn will cause the "WAIT"condition to be "TRUE," because all other logical AND gates will also be "FALSE" (due to states Y1-Y3 and the inversion of D18 through inverter I-0). Once the Hall state transition ("HST") is detected, however, logical AND gate A-1 will be "TRUE," causing O-1 to be "TRUE" and NOR gate NR-0 (and thus the WAIT condition) to be "FALSE," permitting instruction execution sequencing once again to continue normally.

Finally, if waiting is desired until a particular input combination (of inputs I-3-I-5) is detected, then, once again, logical AND gates A-0-A-5 will be "FALSE" (causing the "WAIT" condition to be "TRUE") until one of the desired input combinations matches the value specified in bits D18-D20 of the instruction. The four input combinations are tested via exclusive NOR gates EN-0, EN-1, EN-2 and the logical "OR" (via OR gate O-0) of EN-0, En-3 and EN-4. If a "match" is detected, one of logical AND gates A-2-A-5 will be "TRUE" which will cause logical OR gate O-2 to be "TRUE," causing logical NOR gate NR-0, and thus the "WAIT" condition be "FALSE," permitting instruction execution sequencing once again to continue normally.

Significantly (as is the case with the branching opcode field), all of this waiting and testing of conditions occurs within a single machine cycle, permitting the user to respond rapidly to Hall state transitions. Thus, the user can detect quickly the actual speed of the motor, and then adjust that speed (by causing new velocity values to be driven into the motor, via OPGRP 0 instructions described above) before the actual values detected by the current Hall state transition are no longer accurate (as will be evident by the next Hall state transition values).

A Typical Application Example

Illustrated in FIG. 6 is a typical application design of a DC spin motor controller for a disk drive based on the following specifications:

(1) 1 MHz control block clock.

(2) Desired motor velocity of 3600 revolutions per minute.

(3) Three phase motor with Hall patterns 000, 011, and 110 detected at the three most significant of the five designated input pins.

(4) The least significant input pin receives an active high start signal (START).

(5) The second least significant input pin receives an active high index signal (INDEX).

(6) The least significant of the two outputs indicates an error state (OUT1=ERROR). The other output indicates when final speed is reached (OUT0=FINAL).

Initially, upon receiving a low reset (RST) signal, the device will set all values to their reset state. All functions will be disabled upon reset and, when RST goes high (synchronized with the clock signal, "CLK"), the device will unconditionally jump to Word 0.

Word 0 causes the PMC to wait for the START signal (via the WT(3-0) field discussed above), at which point execution will be transferred to Word 1 (via the JUMP(5-0) and NA1(4-0) fields discussed above).

Word 1 simply initializes the clock generator value, and Word 2 sets the desired dead time value, direction and maximum "no movement time" (as the final velocity). In essence, Word 2 causes the motor to start at the maximum speed of 3600 revolutions per minute.

At this point, the PMC waits for movement of the motor (to the next phase) or for an overflow of the counters (in which case execution will be transferred to Word 17 to handle the error). If normal motor movement (i.e., the next phase) is detected, Words 4 and 5 will set up the proportional error value (Ep) discussed above, and put the device in the "automatic speed adjustment" state. This state (handled by Words 6-10) will insure that the motor reaches the desired 3600 revolutions per minute.

This automatic speed adjustment is accomplished by setting the desired final velocity (Words 6 and 8), detecting the motor's actual velocity at each phase (Word 7), and either (i) branching back to Word 7, if the actual velocity is too high or too low, or (2) branching to an error handler (Word 17) if a counter overflow is detected.

Once the desired velocity is reached, the PMC can switch to "index input," during which it will maintain the desired velocity at fixed (less frequent) intervals (via Words 11-15). In other words, rather than comparing the actual and desired velocities at every Hall stat transition, the PMC can be programmed to maintain this velocity at specified time intervals or, for example, every other transition. This permits more precise control over the motor velocity, by enabling the user to modify the control block clock frequency, thereby decreasing the degree of calculation error.

Finally, if a counter overflow is ever detected (causing a branch to Word 17), Words 17 and 18 will disable the output device, output an "ERROR" signal (OUT1=1), and then stop the motor.

It is apparent from this example that a great deal of flexibility is available to user of the PMC. He or she can customize detection of particular Hall state transitions (or sets of Hall state transitions), perform virtually any action in response, such as increasing the motor's velocity, and thus create complex velocity and acceleration profiles, as well as a variety of error detection and correction procedures.

This flexibility is made possible by the extremely rapid response time of the polling, branching and waiting circuitry of this invention. This "one cycle" approach enables the device to perform the user's desired response to particular motor activity in a short period of time not before possible with prior art software loops.

We claim:

1. An apparatus for controlling the operation of a computing device, said apparatus comprising:
   means for providing one or more instruction signals, said instruction signals representing one or more fields of an instruction to be executed by said computing device;
   means for providing one or more data signals, said data signals representing data to be processed by said computing device during the execution of said instruction;
   signal detection means, operatively connected to said means for providing instruction signals and to said means for providing data signals, for detecting, within one machine cycle of said computing device, whether the state of said data signals is within the set of states defined for the current instruction being executed by said computing device;

execution sequencing means, operatively connected to said signal detection means, for determining, within said machine cycle, which instruction of a program, comprising a sequence of said instructions, will be executed by said computing device following the execution of the current instruction, said execution sequencing means comprising sequential means for transferring execution from the current instruction to the next sequential instruction of said program, waiting means for inhibiting said sequential means for one or more machine cycles of said computing device, until said signal detection means detect that the state of said data signals is within the set of states defined for the current instruction, and branching means for inhibiting said sequential means and transferring execution, from the current instruction to another instruction of said program, only if said signal detection means detect that the state of said data signals is within the set of states defined for the current instruction; and means for providing at least one instruction comprising instruction signals for invoking said waiting means, and for providing at least one instruction comprising instruction signals for invoking said branching means.

2. The apparatus of claim 1 wherein at least one of said instructions comprising instruction signals for invoking said branching means also comprises instruction signals representing either the address or address offset of the instruction to which execution will be transferred by said branching means.

3. The apparatus of claim 1 wherein at least one of the states of said data signals represents one of the combinations of values detected by Hall effect position sensors on a brushless dc motor.

* * * * *

UNITED STATES PATENT AND TRADEMARK OFFICE
CERTIFICATE OF CORRECTION

PATENT NO. : 4,868,469

DATED : September 19, 1989

INVENTOR(S) : David A. Chan

It is certified that error appears in the above-identified patent and that said Letters Patent is hereby corrected as shown below:

Col. 2, line 38, second occurrence of "transition" should read --transitions--.

Col. 13, line 68, "JUMP(5-0)" should read --JUMP1(5-0)--.

Signed and Sealed this

Twenty-sixth Day of February, 1991

Attest:

HARRY F. MANBECK, JR.

*Attesting Officer*    *Commissioner of Patents and Trademarks*